United States Patent [19]

Stribiak

[11] Patent Number: 5,505,328
[45] Date of Patent: Apr. 9, 1996

[54] MODULAR CONTAINER APPARATUS

[75] Inventor: John J. Stribiak, Homewood, Ill.

[73] Assignee: Woods & Brooks Ltd., Palos Hills, Ill.

[21] Appl. No.: 325,537

[22] Filed: Oct. 18, 1994

Related U.S. Application Data

[63] Continuation of Ser. No. 34,087, Mar. 22, 1993, abandoned, which is a continuation-in-part of Ser. No. 733,236, Jul. 22, 1991, abandoned.

[51] Int. Cl.$^6$ ................................................. B65D 25/14
[52] U.S. Cl. ................. 220/410; 220/4.24; 206/315.11
[58] Field of Search .................... 206/315.11, 370, 206/373, 477, 480, 514; 248/220.2; 220/4.22, 4.24, 23.83, 23.86, 408, 410, 4.23, 528

[56] References Cited

U.S. PATENT DOCUMENTS

| | | | |
|---|---|---|---|
| D. 252,115 | 6/1979 | Herring | D3/38 |
| D. 337,886 | 8/1993 | Feinbloom | D3/74 |
| 1,669,928 | 5/1928 | Case . | |
| 1,993,144 | 3/1935 | Kasdan | 43/32 |
| 2,717,470 | 9/1955 | Holdeman | 206/315.11 |
| 2,803,368 | 8/1957 | Koch . | |
| 3,121,970 | 2/1964 | Oakes | 43/57.5 |
| 3,275,329 | 9/1966 | Lieberman et al. | 220/528 |
| 3,777,882 | 12/1973 | McIntyre | 206/370 |
| 3,881,273 | 5/1975 | Herring | 43/57.5 R |
| 3,971,360 | 7/1976 | Spoeth, Jr. | 220/408 |
| 4,653,220 | 3/1987 | Olsen, Sr. | 43/57.1 |
| 4,714,158 | 12/1987 | Oltman et al. | 206/373 |
| 5,070,546 | 12/1991 | Stazo et al. | 206/315.11 |
| 5,169,018 | 12/1992 | Fiore | 206/315.11 |

FOREIGN PATENT DOCUMENTS 1014988  8/1952  France .

*Primary Examiner*—Stephen J. Castellano
*Attorney, Agent, or Firm*—Dick and Harris

[57] ABSTRACT

A modular container apparatus for storing and transporting articles, including first and second inner shell members positionable in opposed relation to one another to enclose a storage article volume. First and second outer shell members nestingly receive and are affixed to the first and second inner shell members, respectively. The container also includes interchangeable article positioning members, associated with at least one of the first and second inner shell members, and releasably retained therewithin, for receiving and retaining the articles to be stored and transported.

10 Claims, 1 Drawing Sheet

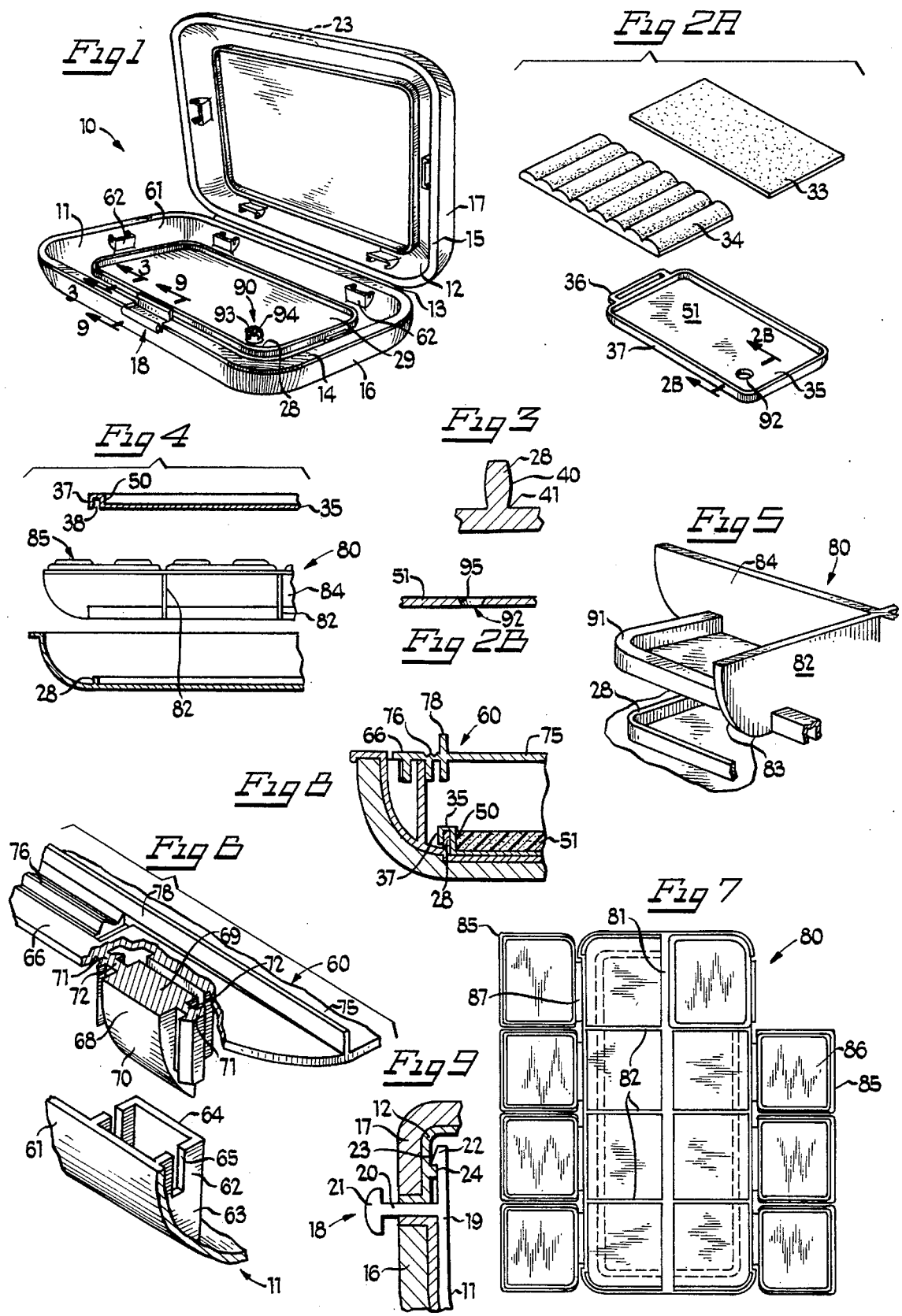

MODULAR CONTAINER APPARATUS

This is a continuation of application Ser. No. 08/034,087, filed on Mar. 22, 1993, now hereby abandoned, which is a continuation-in-part of U.S. patent application Ser. No. 07/733,236, filed Jul. 22, 1991 now abandoned.

BACKGROUND OF THE INVENTION

The present invention is directed to modular container apparatuses for storing and transporting articles, and in particular, for storing small, fragile and or oddly configured articles, such as the lures used by fly-fishermen.

Among the most crucial equipment utilized by fishermen, particularly fly-fishermen, are their lures, which are known as flies. These flies, which are typically combination, artificial, or simulated bait and hook, are hand-made items of great intricacy, configured to resemble a particular form of insect or other animal, which is the natural food of the particular kind fish which is being sought. A fly-fisherman may own many flies, each of which is distinctly configured, according to the specific kind of fish sought. It is even known that particular specific fishing streams will require the use of unique specialized flies. In addition to requiring a way to transport the irregularly-shaped and barbed flies to a particular stream, the fisherman will also need to be able to carry the flies with him into the water, as a fisherman may wish to change lures without having to leave his location in the stream.

To simply carry the flies loosely within a small box is unacceptable in that it is possible for the flies to become entangled, making handling of the flies difficult and leading to potential injury to the fisherman and potential damage to the expensive and intricate flies.

The container of parent application 07/733,236, mentioned hereinabove, has, fixed to its interior surfaces, one or more pads of fabric, or soft foam rubber, into which the barbs of the flies may be shallowly stuck, so as to promote the retention the flies in spaced relation, apart from one another and in protected secure positioning.

However, each small container is capable of holding only a few of the lures. In order to exchange the lures, the fisherman would have to individually remove the lures from the foam pad and store the lures in a separate location, while the subsequent particular lures which are to be used are carried in the container. It is desirable therefore to provide an improved and more readily accomplished way to exchange the lures to be contained in the fisherman's traveling container without the fisherman having to individually remove each lure from the mounting pad. It is additionally desirable to provide a way of storing, between uses, those lures which the fisherman does not carry on any particular outing.

Accordingly, it is an object of the present invention to provide a modular container apparatus for storing and transporting many different kinds of small articles, including fishing flies, in a facilitated protected manner, so that each article is secured in spaced protected relation from the other articles also stored within the container.

Another object of the invention is to provide for the facilitated removal of any particular group of such articles stored within the modular container apparatus so that a substitute group of articles may be readily and collectively inserted and contained therewithin.

Yet another object of the invention is to provide for the facilitated handling and storage of groups of such small articles when such groups of small articles are not stored and transported within said modular container apparatus.

These and other objects of the invention will become apparent in light of the present specification, claims and drawings.

SUMMARY OF THE INVENTION

The present invention is directed to a modular container apparatus for storing and transporting articles. The modular container apparatus comprises first shell means having an interior surface, an exterior surface, and a peripheral edge region. Second shell means also are provided with an interior surface, an exterior surface and a peripheral shallow region. The first and second shell means are operably positionable in juxtaposed relation thereto so as to define and enclose between them an article storage volume; with the first and second shells alternatively positionable from an open to a closed configuration. Interchangeable article positioning means, which are operably associated with at least one of the first and second shell means are removably, securely positionable within the article storage volume to receive and retain the articles to enable placement of the articles within the article storage volume in protected, spaced relationship relative to one another for the protection, storage and transportation of the articles. Means are provided for releasably retaining the interchangeable article positioning means, which are operably associated with the interchangeable article positioning means and the interior surface of at least one of the first and second shell means, to enable removal and substitution of the interchangeable article positioning means without removal of the articles received and retained therewithin from the particular interchangeable article positioning means.

The modular container apparatus further comprises first and second outer shell means which are operably configured to nestingly receive and have affixed therewithin the first and second shell means, respectively.

The interchangeable article positioning means, in a preferred embodiment of the invention, is a tray member, having a peripheral edge region, and which is operably configured to be received within at least one of the first and second shell means along the interior surface thereof. Engagement means are operably arranged on the tray member for engaging the means for releasably retaining the interchangeable article positioning means. The means for releasably retaining the interchangeable article positioning means is in one alternative preferred embodiment, at least one projecting peg member, emanating inwardly away from the interior surface of at least one of the first and second shell means, while the engagement means comprises at least one aperture formed in the tray member for insertingly, grippingly and releasably receiving the at least one projecting peg. In another alternative preferred embodiment, a ridge is arranged along the interior surface of at least one of the first and second shell means and extending inwardly away from the interior surface, into the article storage volume, while the engagement means of the interchangeable article positioning means is a channel formed in the tray member to grippingly and releasably receive the ridge. The tray member further may be provided with at least one tab operably arranged adjacent to the peripheral edge region of the tray member, to facilitate removal of the tray member from the shell means. The tray member, in a preferred embodiment of the invention, is a substantially flat rectangular member having a raised peripheral edge. A foam pad member is operably positioned on the substantially flat rectangular member and received within the raised peripheral edge. The foam pad member may be substantially flat or it may be provided with at least one ridge extending across the foam pad member to separate articles arranged thereon.

In an alternative embodiment of the invention, the tray member may comprise a multi-compartmented tray member having a plurality of intersecting divider members, to define a plurality of substantially separate and isolated compartments within at least a portion of the article storage volume, when the multi-compartmented tray member is received by said first and second shell means. The multi-compartmented tray member may be provided with a plurality of openable closure members, to enable access to individual ones of said plurality of compartments defined thereby while maintaining remaining ones of said compartments in a closed, secured condition.

In a preferred embodiment of the invention, the modular container apparatus may also be provided with article protection means operably disposed upon an opposed interior surface so as to be positioned in juxtaposed, opposed relation to the interchangeable article positioning means, when the first and second shell means are in said juxtaposed, opposed relation to one another.

The means for releasably retaining the interchangeable article positioning means may also comprise tab means operably emanating from at least one position along the substantially peripheral region of said article positioning means, and socket means, operably positioned in at least one of said first and second shell means, for insertingly receiving said tab means in a retaining yet releasable matter.

The modular container apparatus may also be provided with an article storage volume divider member which is operably affixable to at least one of the first and second shell means so as to substantially span said article storage volume and divide same into at least two article storage regions. The divider member is formed with an attachment portion which is removably affixable to one of said first and second shell means. A divider portion is operably associated with the attachment portion. Means for enabling pivoting of the divider portion relative to the attachment portion provides access into the article storage region, enclosed by the one of the first and second shell means and the article storage divider member, by pivoting of the divider portion. The divider portion of the article storage volume divider member may be provided with a ridge arranged along a surface of the divider portion opposite to the enclosed article storage region for receipt of a tray member having engagement means for engaging the ridge to releasably retain the tray member on the divider portion.

Latching means are operably associated with the first and second shell means for releasably retaining the first and second shell means in said juxtaposed, opposed relation. Hinge means are operably connect the first and second shell means to enable pivotable movement of the first shell means relative to the second shell means.

BRIEF DESCRIPTION OF THE DRAWINGS

FIG. 1 is a perspective view of the modular container apparatus according to a preferred embodiment of the invention, showing the snap-fit ridges and sockets for receiving and retaining interchangeable trays and dividers;

FIG. 2A is an exploded perspective view of an interchangeable storage tray, with two possible types of article receiving pads;

FIG. 2B is a side elevation, in section, showing the tapering inner surface of a peg hole, according to FIG. 2A;

FIG. 3 is a fragmentary side elevation, in section, of the snap-fit ridge according to FIG. 1;

FIG. 4 is a fragmentary exploded side elevation, partly in section, showing both the interchangeable tray and alternative interchangeable compartment divider, either of which may be received within one shell of the modular container apparatus of the present invention;

FIG. 5 is a fragmentary exploded perspective view, showing how the compartment divider of the present invention, in one embodiment, may be fitted to the snap-fit ridge;

FIG. 6 is a fragmentary exploded perspective view of the tab and socket configuration for removably installing a hinged divider into the container, in one preferred embodiment of the invention;

FIG. 7 is a top plan view of the compartmented divider of FIG. 4, showing the compartment doors in both open and closed positions;

FIG. 8 is a fragmentary side elevation, in section, showing a tray received in the bottom of a shell of the modular container apparatus, with a hinged divider also positioned in the inner shell; and FIG. 9 is a fragmentary side elevation, in section, taken along line 9—9 of FIG. 3, of a latching mechanism for the modular container apparatus, according to a preferred embodiment of the invention.

DETAILED DESCRIPTION OF THE DRAWINGS

Although this invention is susceptible of embodiment in many different forms, there is shown in the drawings and will be described herein in detail, several embodiments, with the understanding that the present disclosure is to be considered as an exemplification of the principles of the invention and is not intended to limit the invention to the embodiments illustrated.

FIG. 1 shows a perspective view of a modular container apparatus for storing articles, for example fisherman's lures. Modular container apparatus 10 includes shells 11 and 12. Typically, shells 11 and 12 will be manufactured from a flexible plastic material and will be connected by configurously formed hinge 13, which is known as a "living" hinge. By pivoting shells 11 and 12 toward each other around living hinge 13, living shells 11 and 12 may be brought together in aligned configuration with peripheral edges 14 and 15 extending substantially coextensively with one another. Outer shells 16 and 17 are configured to nestingly receive shells 11 and 12, respectively. Outer shells 16 and 17 may be fabricated, for example, from exotic woods or other decorative materials. If wood is used for the outer shells, when modular container apparatus 10 is closed, it is intended to be buoyant enough to float, so as to facilitate its use in water, such as a fishing stream, and to facilitate its recovery, should it become separated from the fisherman.

In order to keep shells 11 and 12 held together, latch mechanism 18 is provided (FIG. 9). In a preferred embodiment of the invention, latch mechanism 18 is formed from a tab 19 which projects upwardly from the side of shell 11, and is made flexible by vertical cuts formed in shell 11. A horizontally extending portion 20 of tab 19 is formed by cuts located in edge 14. A thumb tab 21, which may be generally oval in shape, is formed upon horizontal tab portion 20. Tab 19 also has a wedge-shaped catch surface 22. Tab 19, being partially cut-away from shell 11, is capable of inward and outward pivoting movement. When shell 12 is brought toward shell 11, tab 19 will encounter notch 23 formed in edge 15 of shell 12. Wedge-shaped catch member 22 causes tab 19 to be bent inwardly, until edge 24 of catch surface 22 enters notch 23, at which time tab 19 flexes back toward its initial position, and wedge-shaped catch surface 22 engages notch 23 to prevent shells 11 and 12 from being opened. To open modular container apparatus 10, thumb tab 21 is pressed inwardly, simultaneously bending tab 19 away from notch 23. When wedge-shape catch surface 22 clears notch 23, then modular container apparatus 10 may be opened.

Modular container apparatus 10 is provided with several advantageous features including removable trays for holding the lures, and flexible pivotable dividers which may be used to separate and create two separate compartments corresponding to each of the shells 11 and 12.

A ridge 28 is arranged in a substantially rectangular configuration along substantially the periphery of bottom portion 29 of shell 11. Ridge 28 has a cross-sectional configuration which has its widest point 40 positioned away from the base 41, as seen in FIG. 3. Tray 35 (FIG. 2A) is configured to substantially overlie flat portion 29 of shell 11. Tray 35 has overhanging lip 37 arranged around its periphery, to form peripheral slot 38, which is configured to receive, in forced press-fit fashion, ridge 28. Overhanging lip 37 extends outwardly and downwardly from side walls 50 which, together with flat portion 51 of tray 35, form a shallow recess. The recess is configured to receive and have affixed therein either a flat foam pad, such as pad 33 or a contoured foam pad, such as rippled contoured pad 34. Tray 35 may also have attached thereto a laterally extending flexible tab 36 which is provided to facilitate the removal of tray 35 from modular container apparatus 10. It may be desired to utilize modular container apparatus 10 to hold more than a single layer of lures. Since the layers of lures should not be stored without being physically spaced or separated from one another, divider 60 is provided. Divider 60 has formed thereon and projecting perpendicularly from spine 66, one or more support tabs 68. Each support tab 68 has a generally rectangular cross-section in its upper portion 69. Emanating inwardly from side walls 61 of shell 11 are sockets 62. Each socket 62 is a substantially rectangular slot formed by short vertical walls 63, a long vertical wall 64 and a portion of side wall 61. Vertically extending slots 65 are arranged in short vertical walls 63. A outwardly facing wall 70 is curved so as to correspond to the curvature of side wall 61. Projecting laterally from tab 68 are splines 71, each of which has a substantially arrow or T-shaped cross-sectional configuration with a narrow portion 72 being configured to be insertingly received by slots 65. Generally, tab 68 is configured to be insertingly received within socket 62 with a forced but releasable friction fit.

Instead of using the combination of ridge 28 and slot 38, or the combination of tab 68 and socket 62, to hold tray 35 within shell 11, the alternative combination of peg 90 and peg hole 92 may be provided. Each peg 90 (only one of which is illustrated in FIG. 1) has the general shape of an inverted truncated cone. Intersecting, vertically extending slots 93, 94, enable peg 90 to be flexibly, resiliently compressed. Peg hole 92 (only one of which is illustrated in FIG. 2A) has a tapered surface 95 (See FIG. 2B), so that when aligned with peg 90, the tapered surface 95 compresses together the upper end of peg 90, sufficiently to permit peg 90 to be received within peg hole 92. The upper end of peg 90 thereafter expands to hold tray 35 with a friction/interference fit against surface 95. If sufficient lifting force is exerted on tray 35, it can then be "popped" off of peg 90 in the reverse of the just-described procedure.

Main flap section 75 of divider 60 is connected to spine 66 by a further contiguously formed living hinge 76. A further ridge 78, having a configuration substantially similar to that of ridge 28, previously discussed, may be arranged along a side of main flap 75, so as to be on an opposite side of divider 60, from support tabs 68. In this manner, when support tabs 68 have been fully inserted into sockets 62 and flap 75 is in its normal position, a further tray 35 may be fitted onto ridge 78 for the placement of additional articles.

As an additional measure to protect articles placed on, or stuck into, foam pads 33/34, a further foam pad (not shown) may be positioned on whatever surface is immediately above, adjacent and opposite to foam pad 33/34, whether it be the "underside" of a divider 60 or the surface of the opposed shell, so as to cushioningly press the articles between two layers of foam, to substantially immobilize same without the exertion of potentially damaging force.

As an alternative to the use of tray 35, or a combination of divider 60 and tray 35, it may be desired to provide for the division of the interior space of modular container apparatus 10 into a number of separate compartments. Accordingly, compartmented divider 80 is provided (FIGS. 4, 5, 7). Compartmented divider 80 is supported by a substantially rigid spine 81 (not shown in FIGS. 4 and 5) which is configured to extend substantially across the interior width of the interior space of modular container apparatus 10. Extending substantially perpendicular to spine 81 are a series of lateral dividers 82, which extend completely from side to side of compartmented divider 80. Lateral dividers 82 include curved edges 83, which are configured to accommodate and align with the curvature of side wall 61 of, for example, shell 11. Vertically extending divider 84 extends beneath and substantially the length of spine 81. A number of doors 85 are pivotably arranged in the plane of spine 81. Each door 85 may include a transparent window 86. Each door 85 is indirectly connected to spine 81, by a living hinge 87, spanning adjacent lateral dividers 82, such that when each door 85 is at rest, it lies atop adjacent lateral dividers 82. Living hinge 87 is provided with a certain amount of bias so as to tend to keep each door 85 in position parallel with spine 81 and down against lateral dividers 82. Alternatively, the inwardly facing edges of doors 85 may be provided with downward projecting snap tabs (not shown), which may create an interference fit against the edges of spine 81.

Divider 80 may be advantageously configured to be received within shell 11 in the same manner as interchangeable tray 35. See FIG. 5. Specifically, receiving channel 91 may be provided, which connects and is supported by divider 84 and lateral dividers 82, and which has a cross-sectional configuration adapted to align with and receive, in a forced-fit manner, ridge 28. When a compartmented divider 80 is so positioned within shell 11, lateral dividers 82 and longitudinal divider 84 are brought substantially against the interior surface of shell 11 so as to create a plurality of separate and substantially isolated compartments corresponding to the number of doors 85 so provided. Compartmented divider 80 may be alternatively provided with perpendicularly projecting support tabs which are, in the preferred embodiment of the invention, substantially identical in structure and mode of operation to support tabs 68 described previously.

Both shells 11 and 12 may have ridges 28 and/or sockets 62 provided, so that, for example, a tray, and divider and tray combination may be used within, for example, shell 11, while a compartmented divider 80 is used within shell 12 so as to provide for a maximized storage capacity and separation and protection of stored articles within modular container apparatus 10.

The foregoing description and drawings merely explain and illustrate the invention and the invention is not limited thereto except insofar as the appended claims are so limited, as those skilled in the art who have the disclosure before them will be able to make modifications and variations therein without departing from the scope of the invention.

What is claimed is:

1. A modular container apparatus for storing and transporting articles, comprising:

means for providing an upper housing member, said upper housing means having an interior surface defining an interior region, an exterior surface, and a peripheral edge region;

means for providing a lower housing member, said lower housing means having an interior surface defining an interior region, an exterior surface and a peripheral edge region, said upper and lower housing means being operably positionable in juxtaposed opposed relation thereto for defining and enclosing therebetween an article storage volume and repositionable from an open configuration to a closed configuration about said article storage volume;

interchangeable article positioning means, operably associated with at least one of said upper and lower housing means, to be removably and affixably positionable within said article storage volume, for receiving and retaining said articles to enable placement of said articles within said article storage volume in protected, spaced relationship relative to one another, for the protected storage and transportation of said articles, regardless of the orientation of the container apparatus during said storing and transporting of said articles; and means operably associated with both said interchangeable article positioning means and said interior surface of said at least one of said upper and lower housing means, for positively, yet releasably gripping and holding said interchangeable article positioning means within said article storage volume to enable removal and substitution of said interchangeable article positioning means without removal of individual ones of said articles received and retained therewithin from said interchangeable article positioning means, said interchangeable article positioning means comprising a tray member, having a peripheral edge region, and operably configured to be received within said at least one of said upper and lower housing means, along said interior surface thereof; and engagement means, operably arranged on said tray member, for engaging said means for positively, yet releasably gripping and holding said interchangeable article positioning means, said means for positively, yet releasably gripping and holding said interchangeable article positioning means comprising at least one projecting member emanating from said interior surface of at least one of said upper and lower housing means and toward at least a portion of a respective one of said interior regions, wherein said at least-one projecting member releasably grips said tray member without said at least one projecting member penetrating through either of said exterior surfaces of said upper and lower housing means.

2. A modular container apparatus for storing and transporting articles, comprising:

means for providing an upper housing member, said upper housing means having an interior surface, an exterior surface, and a peripheral edge region;

means for providing a lower housing member, said lower housing means having an interior surface, an exterior surface and a peripheral edge region, said upper and lower housing means being operably positionable in juxtaposed opposed relation thereto for defining and enclosing therebetween an article storage volume and repositionable from an open configuration to a closed configuration about said article storage volume;

interchangeable article positioning means, operably associated with at least one of said upper and lower housing means, to be removably and affixably positionable within said article storage volume, for receiving and retaining said articles to enable placement of said articles within said article storage volume in protected, spaced relationship relative to one another, for the protected storage and transportation of said articles, regardless of the orientation of the container apparatus during said storing and transporting of said articles; and means operably associated with both said interchangeable article positioning means and said interior surface of said at least one of said upper and lower housing means, for positively, yet releasably gripping and holding said interchangeable article positioning means within said article storage volume to enable removal and substitution of said interchangeable article positioning means without removal of individual ones of said articles received and retained therewithin from said interchangeable article positioning means, said interchangeable article positioning means comprising a tray member, having a peripheral edge region, and operably configured to be received within said at least one of said upper and lower housing means, along said interior surface thereof; and engagement means, operably arranged on said tray member, for engaging said means for positively, yet releasably gripping and holding said interchangeable article positioning means, said means for positively, yet releasably gripping and holding said interchangeable article positioning means comprising at least one projecting member emanating from said interior Surface of at least one of said upper and lower housing means and toward at least a portion of a respective one of said interior region without said at least one projecting member penetrating through either of said exterior surfaces of said upper and lower housing means, said engagement means comprising at least one aperture formed in said tray member for insertingly, grippingly and releasably receiving said at least one projecting member in alignment therewith.

3. The modular container apparatus for storing and transporting articles according to claim 2 wherein the at least one projecting member comprises at least one peg.

4. The modular container apparatus for storing and transporting articles according to claim 1 wherein said engagement means comprises:

at least one aperture formed in said tray member for insertingly, grippingly and releasably receiving said at least one projecting member in alignment therewith; and, wherein said at least one projecting member comprises at least one peg.

5. The modular container apparatus for storing and transporting articles according to claim 1 wherein said tray member further comprises:

at least one tab operably arranged substantially adjacent to said peripheral edge region of said tray member, to facilitate removal of the tray member from a respective one of the upper or lower housing means.

6. The modular container apparatus for storing and transporting articles according to claim 1 wherein said tray member further comprises:

a substantially flat rectangular member, having a raised peripheral edge.

7. The modular container apparatus for storing and transporting articles according to claim 6 wherein said article positioning means further comprises:

a foam pad member operably positioned on said substantially flat rectangular member, and received within said raised peripheral edge.

8. The modular container apparatus for storing and transporting articles according to claim 7 wherein said foam pad member is provided with at least one ridge extending across said foam pad member to separate articles arranged thereon.

9. The modular container apparatus for storing and transporting articles according to claim 1 further comprising:

latching means operably associated with said upper and lower housing means for positively, yet releasably gripping and holding said upper and lower housing means in said-juxtaposed, opposed relation.

10. The modular container apparatus for storing and transporting articles according to claim 1 further comprising:

hinge means operably engaging said upper and lower housing means to enable pivotable movement of said upper housing means relative to said lower housing means.

* * * * *